(12) United States Patent
Brooks (10) Patent No.: US 7,423,554 B2
(45) Date of Patent: Sep. 9, 2008

(54) AIRCRAFT SECURITY SYSTEM

(75) Inventor: Timothy J. Brooks, Iron Mountain, MI (US)

(73) Assignee: Brooks Aviation Services, Inc., Iron Mountain, MI (US)

( * ) Notice: Subject to any disclaimer, the term of this patent is extended or adjusted under 35 U.S.C. 154(b) by 698 days.

(21) Appl. No.: 11/138,652

(22) Filed: May 26, 2005

(65) Prior Publication Data

US 2006/0131958 A1 Jun. 22, 2006

Related U.S. Application Data

(60) Provisional application No. 60/576,262, filed on Jun. 2, 2004.

(51) Int. Cl.
*G08B 21/00* (2006.01)
(52) U.S. Cl. .................. 340/945; 340/426.1; 340/693.2
(58) Field of Classification Search ............... 340/426.1, 340/693.2, 945
See application file for complete search history.

(56) References Cited

U.S. PATENT DOCUMENTS

| | | | |
|---|---|---|---|
| 4,749,873 A | 6/1988 | Mutoh | |
| 5,159,344 A | 10/1992 | Robinson et al. | |
| 5,323,140 A | 6/1994 | Boyles | |
| 5,479,162 A * | 12/1995 | Barger et al. | 340/945 |
| 5,637,929 A | 6/1997 | Treharne | |
| 5,751,093 A | 5/1998 | Nakamura | |
| 6,113,649 A | 9/2000 | Govindaraj | |
| 6,757,596 B1 | 6/2004 | Moberg | |
| 7,225,976 B1 * | 6/2007 | Moberg | 235/380 |

OTHER PUBLICATIONS

"New Anti-Terrorist Security Device Prevents Aircraft Theft and Tampering", *Raytheon Aircraft Company News Release*, (Jan. 19, 2005),1 pg.

* cited by examiner

*Primary Examiner*—George A Bugg
*Assistant Examiner*—Samuel J Walk
(74) *Attorney, Agent, or Firm*—Schwegman, Lundberg & Woessner, P.A.

(57) ABSTRACT

The security system provides an aircraft security system capable of protecting both single and multiple engine aircraft. Variations of the present system prevent unauthorized starting of protected aircraft and activate an alarm when engine starting it is attempted. Embodiments of the system draw no power from the aircraft when the security system is armed and in no way interferes with the normal starting or operation of the aircraft when the system is disarmed. Embodiments of the present system can activate an alarm when an aircraft's doors or panels are opened. Embodiments of the present invention can activate an alarm when installed equipment or other devices are tampered with or removed from their housings.

19 Claims, 5 Drawing Sheets

AIRCRAFT SECURITY SYSTEM

CROSS-REFERENCE TO RELATED APPLICATION(S)

This application claims the benefit under 35 U.S.C. 119(e) from U.S. Provisional Application Ser. No. 60/576,262, filed Jun. 2, 2004, which is incorporated herein by reference in its entirety.

FIELD OF INVENTION

This application relates generally to methods and apparatus for an aircraft security and alarm system.

BACKGROUND

The physical security of aircraft is historically poor on most aircraft in operation today. Aside from the ignition switches, the only security provided on most aircraft is key-type door locks which are generally of poor quality and can be readily opened with a wide variety of keys. Once inside the aircraft, an intruder has easy access to a multitude of easily removable and often expensive avionics and instrumentation devices. Engine ignition is also easily accomplished by an unauthorized person. For example, most single engine aircraft have key-type, turn-to-start ignition switches. The switch units are readily accessible and clearly marked on the back as to the function of each terminal, making the switch units easily bypassed and/or hot wired to achieve ignition. Multi-engine aircraft have no start security in that they have only toggle and/or push-button ignition switches.

Accordingly, there is a need for an aircraft security system that is simple, light-weight, easy to install in new and existing aircraft, and is difficult to detect by an unauthorized person—yet prevents operation of the aircraft when armed. In addition, there is a need for a security system that does not draw power from the aircraft when armed, and is functional only when the aircraft is on the ground and parked.

SUMMARY

The various embodiments described herein relate to methods and apparatus of an aircraft security system. The teachings provided herein solve the earlier mentioned problems and additional problems not stated herein.

Various embodiments of the present system include a system for the protection of aircraft from unauthorized operation and use. Some embodiments of the present system are adapted to provide entry security, as well as security against unauthorized attempts to remove installed devices such as avionic instruments. The security system taught is simple, light-weight, and easy to install on single engine and multiple engine aircraft, both new and used.

One or more embodiments of the security system includes a starter breaker electrically connected to a main power bus and a starter switch where the main power bus is powered by a master switch from a main battery. Embodiments of the system further include a security relay having a first set of contacts and a second set of contacts, where the first set of contacts are electrically connected to the starter switch, a starter relay, and a starter motor. The second set of contacts are electrically connected to a remote battery, an alarm, and an isolation diode. A keyed security switch is electrically connected to the security relay.

A variety of modes of operation are described. In one mode of operation, and for certain embodiments, activation of the aircraft master switch with an open (non activated) security switch allows current to flow from the main power buss through the starter breaker and the normally closed contacts of the security relay to the starter switch. When the starter switch is closed, the starter relay is activated and current flows to the starter motor, hence starting the engine.

Embodiments of the present invention include another mode of operation, where activation of the master switch with a closed (armed) security switch activates the security relay and transfers its contacts, preventing power from reaching the starter motor while also drawing current from a remote battery to energizing an alarm. In one or more embodiments, an alarm is continuously energized and the relay activated (latched) by current flowing from the remote battery back through the security relay contacts and an isolation diode to the relay coil, keeping it activated. In an embodiment, the alarm is deactivated and the security relay opened by momentary activation of a remote normally closed switch that, when opened, terminates current flow from the remote battery to the alarm and the security relay.

Further embodiments of the system include, but are not limited to, implementation with solid state devices such as transistors, diodes and silicon controlled rectifiers. One or more embodiments of the present system relate to functional control of aircraft starting options, management of avionics, and control surface articulation. One or more embodiments include, but are not limited to, security switch arming and disarming alternatives including physical keys, coded key cards, microprocessors, remote fobs (transmitting over inferred, visible light, magnetic transfer, or radio frequencies) coded touch key pads, retina, face or finger print recognition, remote arming and disarming systems via telephone or cellular phone, and other radio frequency (RF) devices.

One or more embodiments of the present system include, but are not limited to, alarm alternatives including various audible and/or visual alarms, silent alarms that would notify the owner or operator, and would notify law enforcement authorities or aircraft/airport controlling agencies. One or more embodiments of the present system include, but are not limited to, door and access entry and avionics security systems, including but not limited to, Hall effect switches, reed switches, optical switches, or other motion or pressure detection proximity switches.

Various embodiments of the present system include a system for securing an aircraft having a starter, a starter switch, a master switch to connect a first power source to a main power bus in an on position, comprising a security system connected to control power to the starter, the security system including: a security switch adapted to arm the security system in an armed state and disarm the security system in a disarmed state, a second power source to provide backup power to the security system, a controllable switch adapted to complete a starter circuit for powering the starter in a first mode and break the starter circuit in a second mode, the controllable switch adapted to be controlled by sensing states of at least the security switch and the main power bus, wherein in the armed state the security system is configured to prevent activation of the starter upon detection of attempted use of the aircraft before disarming the security system.

One or more embodiments of the present system include an aircraft electrical system comprising a master switch connected to a battery, a starter relay having a starter switch interconnecting the main switch to the starter relay, a security switch connected to the main switch; and a security relay having a coil connected to the security switch, wherein the security relay interconnects the main switch and the starter relay in a coil unpowered state of operation, and further disconnects the main switch and the starter relay and interconnects a remote battery and the coil in a coil powered state of operation.

Various embodiments of present system include an apparatus for securing an aircraft, comprising a first power supply; a starter and starter relay for use in starting an engine of the aircraft; a main power buss and master switch providing power to the starter relay and starter; and switch means for controllably disconnecting the first power supply from the starter relay and starter upon detection of an attempted intrusion while in an armed state.

This summary is an overview of some of the teachings of the present application and is not intended to be an exclusive or exhaustive treatment of the present subject matter. Further details about the present subject matter are found in the detailed description below and in the appended claims. Other aspects of the system will be apparent to persons skilled in the art upon reading and understanding the following detailed description and viewing the drawings that form a part thereof, each of which are not to be taken in a limiting sense. The scope of the present system is defined by the appended claims and their legal equivalents.

DETAILED DESCRIPTION

In the following description, for purposes of explanation, numerous specific details are set forth in order to provide a thorough understanding of the various embodiments. It will be apparent, however, to one skilled in the art that the various embodiments may be practiced without some of these specific details. The following description and drawings provide examples for illustration, but are not intended in a limiting sense and are not intended to provide an exhaustive treatment of all possible implementations.

It should be noted that references to "an embodiment" or "one embodiment" in this disclosure are not necessarily to the same embodiment, and such references may contemplate more than one embodiment. Further, the terms "bus" and "buss" are used interchangeably throughout the specification and in the drawings.

Further, references made to actuation of a switch may include opening or closing of a switch. It is understood that embodiments demonstrating a circuit having a switch in a first state may also be reconfigured to a circuit having a switch in a second state without departing from the scope of the present subject matter. Thus, an embodiment having a normally closed switch may be realized in an embodiment having a normally open switch without departing from the present subject matter. Those of skill in the art upon reading and understanding the present application will appreciate that differences in configuration and components may be employed without departing from the scope of the present teachings.

Figure 1A:
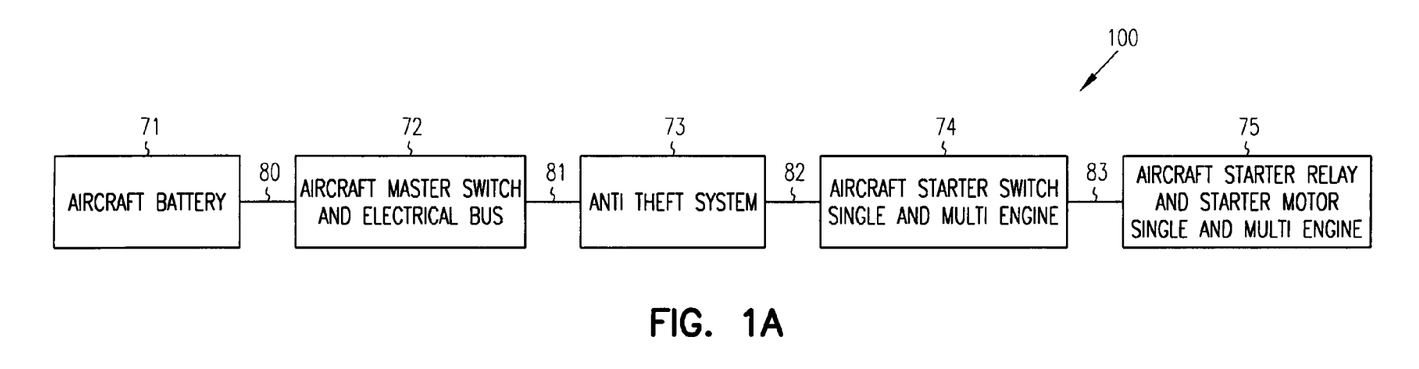
FIG. 1A illustrates a block diagram of one embodiment of the present Aircraft Security System configured for both single and multi engine aircraft.

FIG. 1A illustrates a block diagram of one embodiment of an aircraft security system 100, including block 71 including an aircraft battery, block 72 including an aircraft master switch and an electrical buss, block 73 including an anti-theft system, block 74 including one or more aircraft starter switches for single and multiple engines, and block 75 including one or more aircraft starter relays and starter motors for single and multiple engines. FIG. 1A illustrates blocks 71, 72, 73, 74, and 75 as being coupled by connections 80, 81, 82, and 83 all being shown as a single line. However, it will be realized by those of ordinary skill in the art that connections 80, 81, 82, and 83 may include one or more conductors and one or more other forms of electrical or mechanical couplings between blocks 71, 72, 73, 74, and 75 without departing from the scope of the present subject matter.

In one embodiment, the aircraft battery of block 71 couples through connection 80 to the aircraft master switch and electrical buss of block 72. In one embodiment, the aircraft master switch of block 72, when closed, allows power from the aircraft battery to reach the electrical buss of block 72, and when the aircraft master switch is open, power from the aircraft battery is disconnected from the electrical buss. When the master switch is closed, power from the electrical buss of block 72 is coupled through connection 81 to the anti-theft system of block 73. In one embodiment, the anti-theft system operates in both an activated or armed mode, and a deactivated or unarmed mode. The apparatus and methods for determining the modes and operations of the anti-theft system are described in further detail below.

If power from block 72 reaches block 73 and the anti-theft system is activated, the anti-theft system will disconnect the power supplied from block 72, and thus not allow power for the aircraft battery to power block 74 or block 75. By not allowing power to reach blocks 74 and 75, the anti-theft system of block 73 prevents the starting of the engine or engines present on the aircraft, even if the aircraft starter switch or switches of block 74, as described below, are actuated (closed).

If power from block 72 reaches block 73 and the anti-theft system is deactivated, the anti-theft system will allow the power to be coupled through connection 82 to block 74. In various embodiments, block 74 includes one aircraft starter switch, associated with the singe engine of a single engine aircraft. If power is supplied to block 74 and the aircraft starter switch is actuated (closed), power will be coupled through connection 83 to block 75. In various embodiments, block 75 includes an aircraft starter relay that will be energized by the power supplied through connection 83. When energized, the aircraft starter relay will allow power to reach the starter motor associated with the aircraft engine, and thus allow starting of the aircraft's engine.

In various embodiments, block 74 includes multiple aircraft starter switches, wherein each of the switches is associated with one of the engines of a multiple engine aircraft. If power is supplied to block 74 and one of the aircraft starter switches of block 74 is actuated (closed), power will be coupled through connection 83 to block 75. It will be realized by those of ordinary skill in the art that for multiple engine applications, connection 83 may include separate connections associated with each of the engines of the multiple engine aircraft. In various embodiments, block 75 includes multiple aircraft starter relays, each one being associated with a starter motor. When power is supplied to block 75 through connection 83, the particular starter relay associated with the starter switch being actuated will be energized. When energized, the particular starter relay energized will allow power to reach the aircraft starter motor associated with that starter relay, allowing the aircraft engine associated with that starter motor to be started.

As described above with regards to a single engine aircraft, for a multiple engine aircraft, if power from block 72 reaches block 73 and the anti-theft system is activated, the anti-theft system will disconnect the power supplied from block 72, and thus not allow power from the aircraft battery of block 71 to power block 74 or block 75. By not allowing power to reach blocks 74 and 75, the anti-theft system prevents starting of the engines present on the aircraft, even if the aircraft starter switch of the one or more starter switches of block 74 are actuated (closed). Thus, when activated, the anti-theft system prevents starting for any of the engines on the multiple engine aircraft.

Figure 1B:
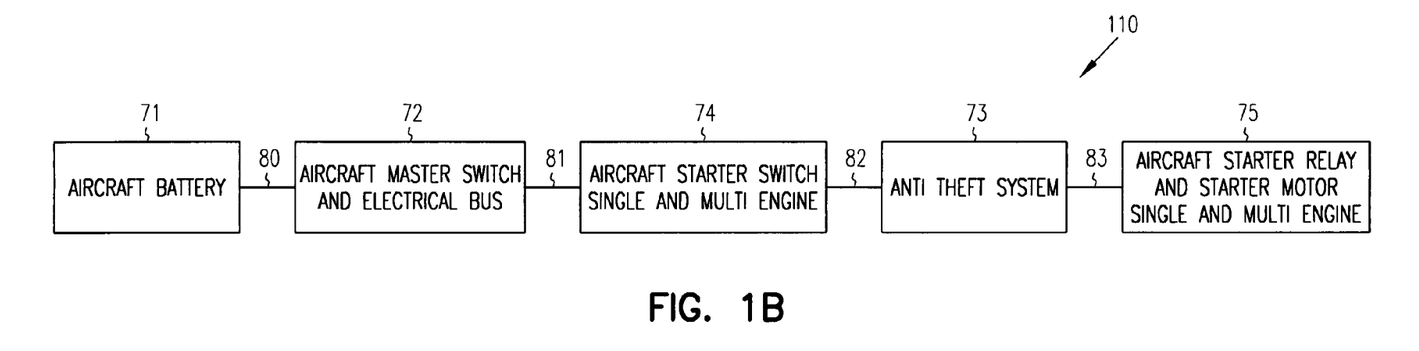
FIG. 1B illustrates a block diagram of one embodiment of the present Aircraft Security System configured for both single and multi engine aircraft.

FIG. 1B illustrates a block diagram of one embodiment of an aircraft security system 110. The embodiment of aircraft security system 110 is similar to the embodiment of system 100, except that block 74 (aircraft starter switch-single and multiple engine) is coupled to block 72 through connection 81, and block 74 is further coupled to the anti-theft system of block 73 through connection 82. The anti-theft system of block 73 is coupled to block 75 through connection 83. System 110 functions in a similar manner to system 100. However, one embodiment may be preferred over the other with regards to installment of the system on an aircraft due to, among other factors, physical access to the various portions of the circuits in the aircraft.

Figure 2:
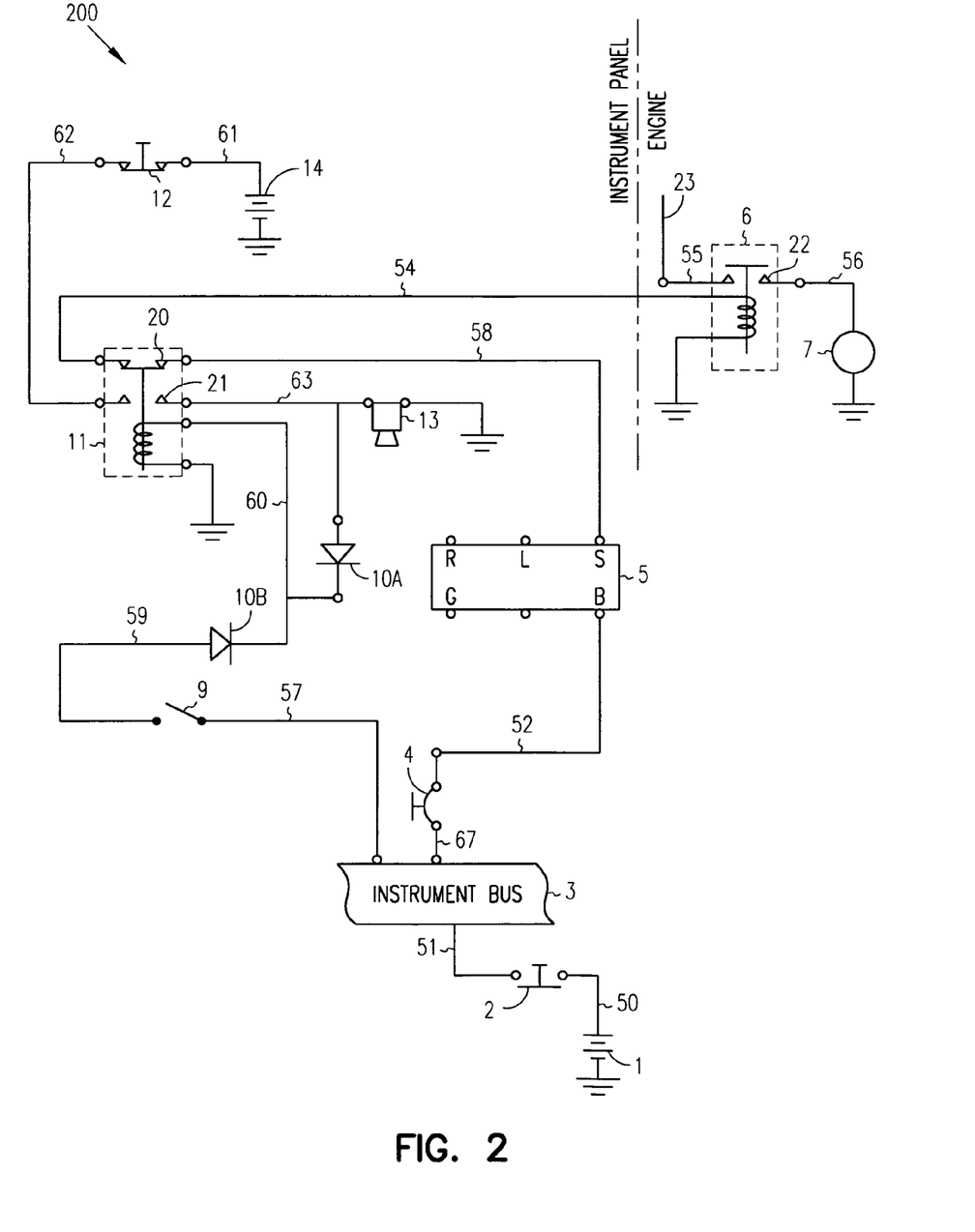
FIG. 2 illustrates a schematic view of one embodiment of the present Aircraft Security System configured for single engine aircraft.

FIG. 2 illustrates one embodiment of an aircraft security system 200 including a starter breaker 4 electrically connected to main power bus 3 and a starter switch 5, where the main power bus 3 is powered by a master switch 2 from a main battery 1. In various embodiments, main power bus 3 may be an instrument bus. System 200 further includes a security relay 11 having activation means for a first set of contacts 20 and a second set of contacts 21, where the first set of contacts 20 are normally closed, and are electrically connected to a starter switch 5, a starter relay 6, and where the second set of contacts 21 are normally open and are electrically connected to a remote battery 14, a remote switch 12, an alarm 13, and a diode 10A. A security switch 9 is electrically connected to the security relay 11. In one embodiment, security switch 9 is a key lock switch. Other embodiments having different types of switches are possible without departing from the scope of the present subject matter.

System 200 includes one or more modes of operation. In normal, unarmed operation, security switch 9 is open, and the control coil of security relay 11 is de-energized. In this mode, normally closed contacts 20 of security relay 11 will be in a closed state. Activation of the master switch 2 and the starter switch 5 in this mode causes current to flow through the normally closed contacts 20 of the security relay 11, allowing current flow from main power bus 3 and starter breaker 4, to the starter relay 6, which, when energized, closes contacts 22 of starter relay 6. With contacts 22 closed, power is delivered to starter motor 7 from starter bus 23 through electrical connection 55, contacts 22, and electrical connection 56.

In another mode of operation of system 200, security switch 9 is closed. The control coil of security relay 11 is electrically coupled to main power bus 3 through electrical connection 60, security switch 9, electrical connection 57. In one embodiment, diode 10B couples electrical connection 60 with electrical connection 59, electrical connection 59 being coupled to security switch 9. Activation of master switch 2 with a closed (armed) security switch 9 allows current from main battery 1 to flow through master switch 2 to the main power bus 3, and thus energizes the control coil of security relay 11, causing normally closed contacts 20 to open. With normally closed contacts 20 open, the current flow from the main power bus 3 to starter relay 6 is disconnected. Starter relay 6 remains de-energized, and contacts 22 remain open. With contacts 22 open, no power is delivered to starter motor 7 from the starter bus 23. With normally closed contacts 20 open, activation of starter switch 5 will not allow power from main battery 1 to energize starter relay 6, and thus will prevent starting of the aircraft.

FIG. 2 illustrates an embodiment of the security system 200 in which at least one application is configured for single engine aircraft. During normal operation, the master switch 2 is closed, allowing battery power from the main battery 1 to flow to the main power bus 3 through electrical connections 50 and 51. During a normal ignition sequence, current flows from the main power bus 3 through electrical connection 67 to starter breaker 4, then through electrical connection 52 to starter switch 5. When starter switch 5 is actuated (closed), current flows through starter switch 5, and through electrical connection 58 to the normally closed contacts 20 of the security relay 11. From normally closed contacts 20, current flows through electrical connection 54, energizing the control coil of starter relay 6, and closing contacts 22, providing power to the engine starter motor 7 from starter bus 23 through electrical connection 55, contacts 22, and electrical connection 56.

In various embodiments, the security switch 9 includes, but is not limited to, a toggle switch, a key pad, or a biometric security device which is activated for proper operation of the aircraft. In various embodiments, activation may include entering a Personal Identification Number (PIN) on a key pad before proper operation of the aircraft will be enabled. In various embodiments, the function and location of the security switch 9 is known only to authorized operators of the aircraft. In one or more embodiments, when the owner/operator desires security, the normally open security switch 9 is closed. Once security switch 9 is closed, activating the master switch 2 causes current to flow from the main power bus 3 along electrical connection 57 to the now closed (armed) contacts of the security switch 9. Power is now available, through electrical connection 60, to the control coil of security relay 11, activating security relay 11. In various embodiments, the path of current flow includes electrical connection 59 and diode 10B.

Activation of security relay 11 causes various events to occur. In an embodiment, the energized security relay 11 opens the normally closed contacts 20, thus opening the start circuit and preventing starter motor 7 from energizing, even when starter switch 5 is actuated, or if starter switch 5 is tampered with. For example even if the "S" and "B" terminals of starter switch 5, as illustrated in FIG. 2, are jumpered or otherwise shorted, the normally open contacts 20 will prevent power from being delivered to starter relay 6, and thus prevent starting of the aircraft's engine.

In various embodiments, the energization of security relay 11 will close normally open contacts 21. With normally open contacts 21 closed, current can flow from remote battery 14 through electrical connection 61 and through remote switch 12 and through electrical connection 62, and through the now closed normally open contacts 21 of the security relay 11. Current then continues to flow through electrical connection 63 and diode 10A to electrical connection 60, providing a second source of current flow through the control coil of security relay 11, keeping security relay 11 energized (latched). In various embodiments, the current flow to electrical connection 63 will allow alarm 13 to become activated. Once latched, security relay 11 and alarm 13 will remain activated even if starter breaker 4 is opened or if the aircraft's primary power is removed from the main power bus 3 by opening the aircraft's master switch 2. Alarm 13 is deactivated by opening the contacts of remote switch 12. In various embodiments, the function and location of the remote switch 12 is known only to the owner/operator of the aircraft or other authorized persons.

Figure 3:
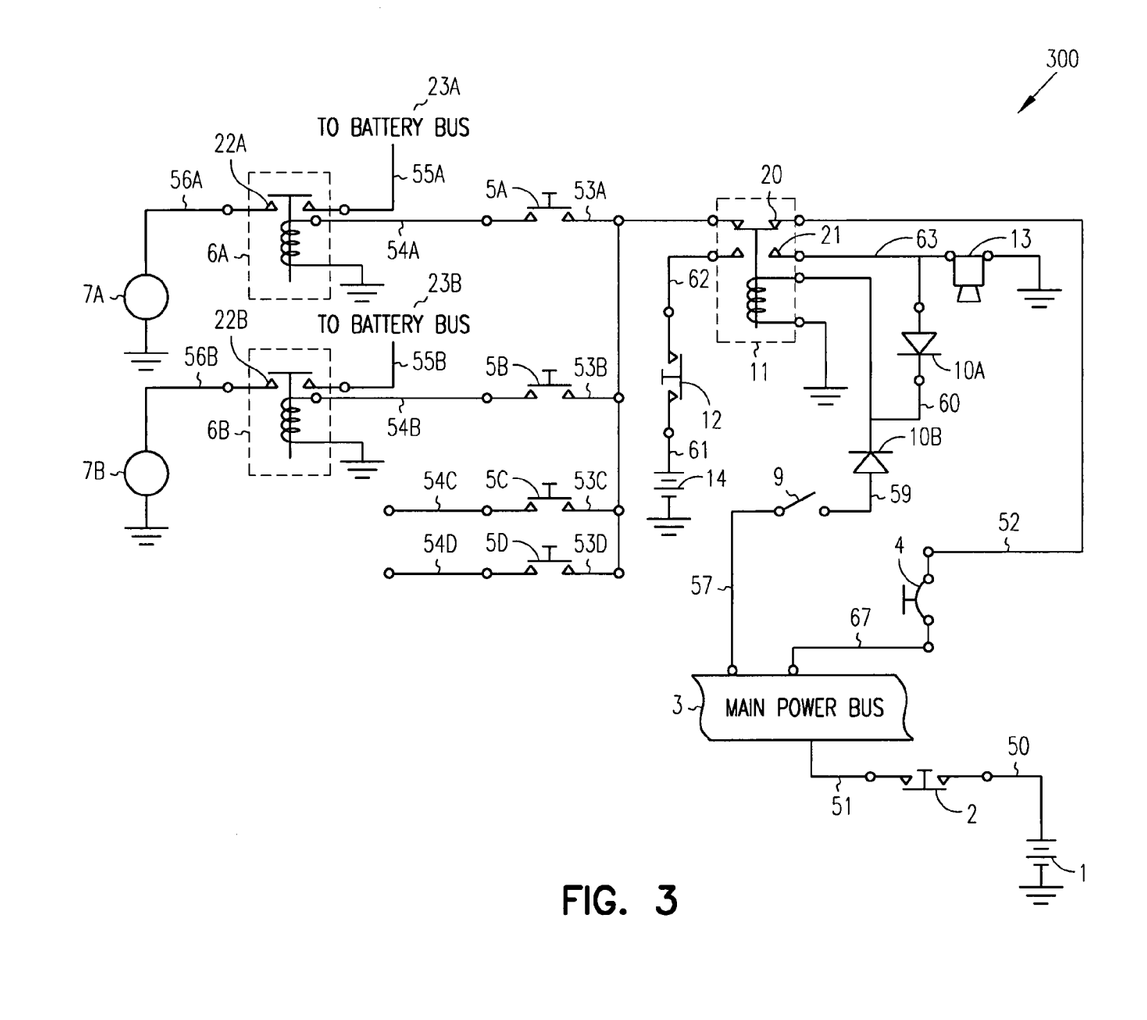
FIG. 3 illustrates a schematic view of one embodiment of the present Aircraft Security System configured for multi engine aircraft.

FIG. 3 illustrates an embodiment where the security system 300 is useful in applications, including, but not limited to, use in multiple engine aircrafts. Reference numbers are repeated for elements of FIG. 3 which are the same or similar to those of FIG. 2. Elements in FIG. 3 depicting additional iterations of the same or similar elements as depicted in FIG. 2 are shown using the same reference numbers with the addition of a letter, for example, "A" or "B." According to various embodiments of system 300, during normal operation, master switch 2 is activated allowing battery power to flow from main battery 1 to main power bus 3. During a normal ignition sequence, current flows from main power bus 3 through electrical connection 67 and starter breaker 4, then through electrical connection 52 to the normally closed contacts 20 of security relay 11. In various embodiments, the current continues to flow through electrical connections 53A and 53B to the normally open contacts of the engine starter switches 5A and 5B respectively. In various embodiments, current also flows to additional engine starting circuits, for example, electrical connections 53C and 53D to the normally open contacts of starter switches 5C and 5D respectively. For purposes of illustration, only the complete starting circuits associated with starter switches 5A and 5B are shown and further discussed in detail. However, it will be recognized by those skilled in the art that similar iterations of these circuits could be duplicated without departing from the scope of the present subject matter.

In one embodiment, starter switches 5A and 5B are operated by separate means. In one embodiment, starter switches 5A and 5B may be operated at separate times. When starter switch 5A is activated, current flows through its closed contacts and electrical connection 54A to the associated starter relay 6A, energizing the control coil of starter relay 6A, and closing contacts 22A. With contacts 22A closed, current from starter bus 23A flows through electrical connection 55A, contacts 22A, and electrical connection 56A to power starter motor 7A. Thus, the starting of the aircraft's engine associated with starter motor 7A is enabled.

When the starter switch 5B is activated, current flows through its closed contacts and electrical connection 54B to the associated engine starter relay 6B, energizing the control coil of starter relay 6B, and closing contacts 22B. With contacts 22B closed, current from starter bus 23B flows through electrical connection 55B, contacts 22B, and electrical connection 56B to power starter motor 7B. Thus, the starting of the aircraft's engine associated with starter motor 7B is enabled.

As discussed above, various embodiments of security system 300 include additional electrical connections 53C and 53D that are coupled to starter switches 5C and 5D respectively. These additional circuits and starter switches are coupled to additional starter relays (not shown) and starter motors (not shown). It will be realized by those of skill in the art that additional circuits and various combinations of starter switches are possible without departing from the scope of the present subject matter.

In various embodiments, the function and location of the security switch 9 is known only to authorized operators of the aircraft. When the owner/operator desires security, security switch 9 is activated (closed). In an embodiment, when security switch 9 is activated and an unauthorized start is attempted, current flows from main power bus 3, through electrical connection 57 and the now closed security switch 9, through electrical connection 60, and to the control coil of security relay 11, thus activating security relay 11. In one embodiment, electrical connection 60 is coupled to security switch 9 through electrical connection 59 and diode 10B.

When security relay 11 is activated, various events occur. In an embodiment, the normally closed contacts 20 of the security relay 11 open, removing power from the starter switches 5A and 5B, and preventing either of the engines from being started, even if starter switches 5A or 5B are actuated. In an embodiment, when security relay 11 is activated, the normally open contacts 21 of security relay 11 close, allowing power to flow from the remote battery 14 through the remote switch 12 and electrical connections 61, and 62, through the now closed contacts of normally open contacts 21, and through electrical connection 63 to the audio alarm 13. Current also flows from electrical connection 63 through diode 10A to keep the security relay 11 activated (latched) even if the starter breaker 4 is reopened or when the aircraft's primary power is removed from the main power bus 3 by re-opening the aircraft's master switch 2. In one embodiment, once security switch 9 is opened (unarmed), the audible alarm 13 is turned off by opening remote switch 12. This removes power from the alarm 13 as well as from the control coil of the security relay 11, unlatching security relay 11. Unlatching security relay 11 causes normally open contacts 21 to open, and normally closed contacts 20 to close.

Figure 4:
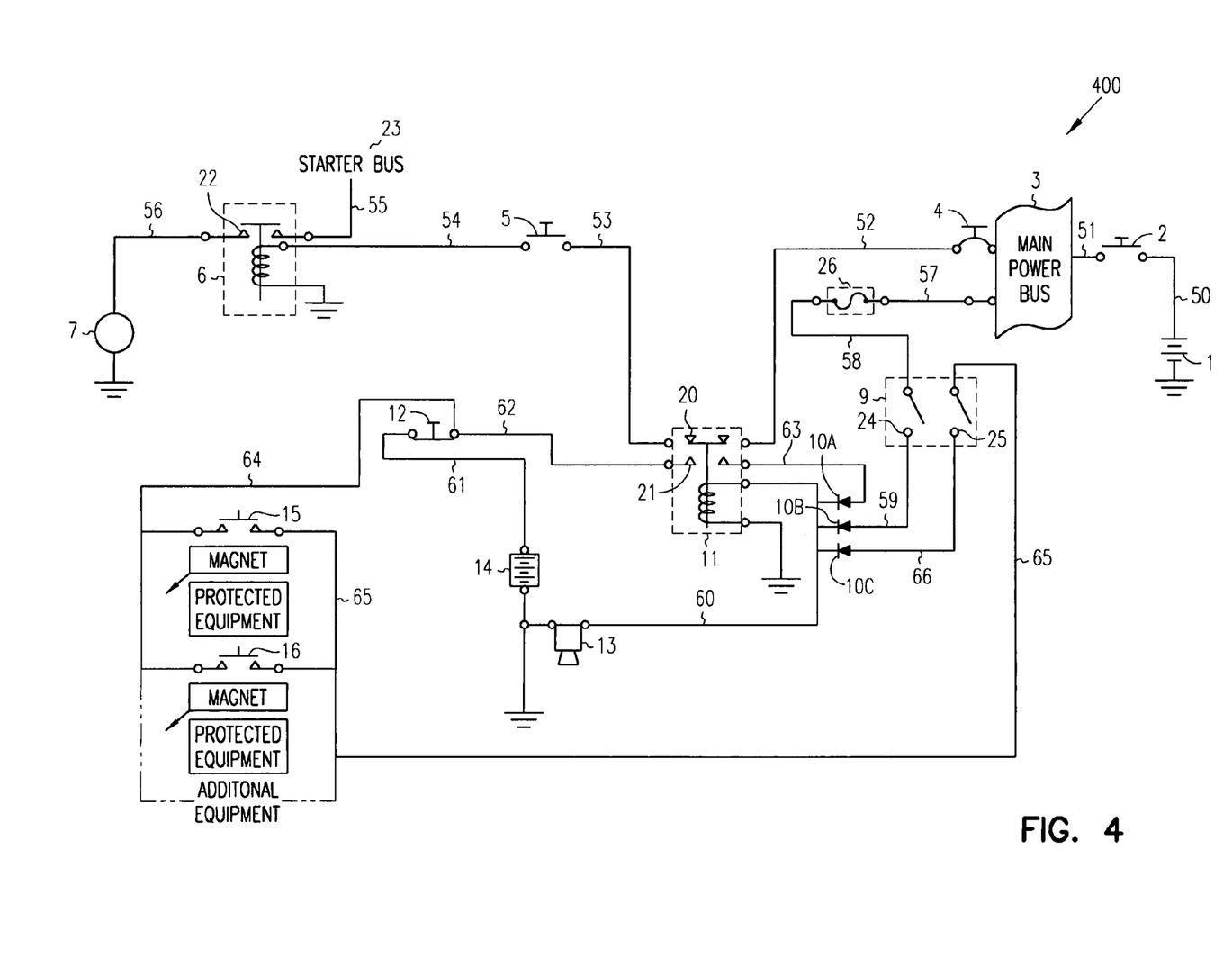
FIG. 4 illustrates a schematic view of one embodiment of the present Aircraft Security System configured for single engine aircraft.
Figure 5:
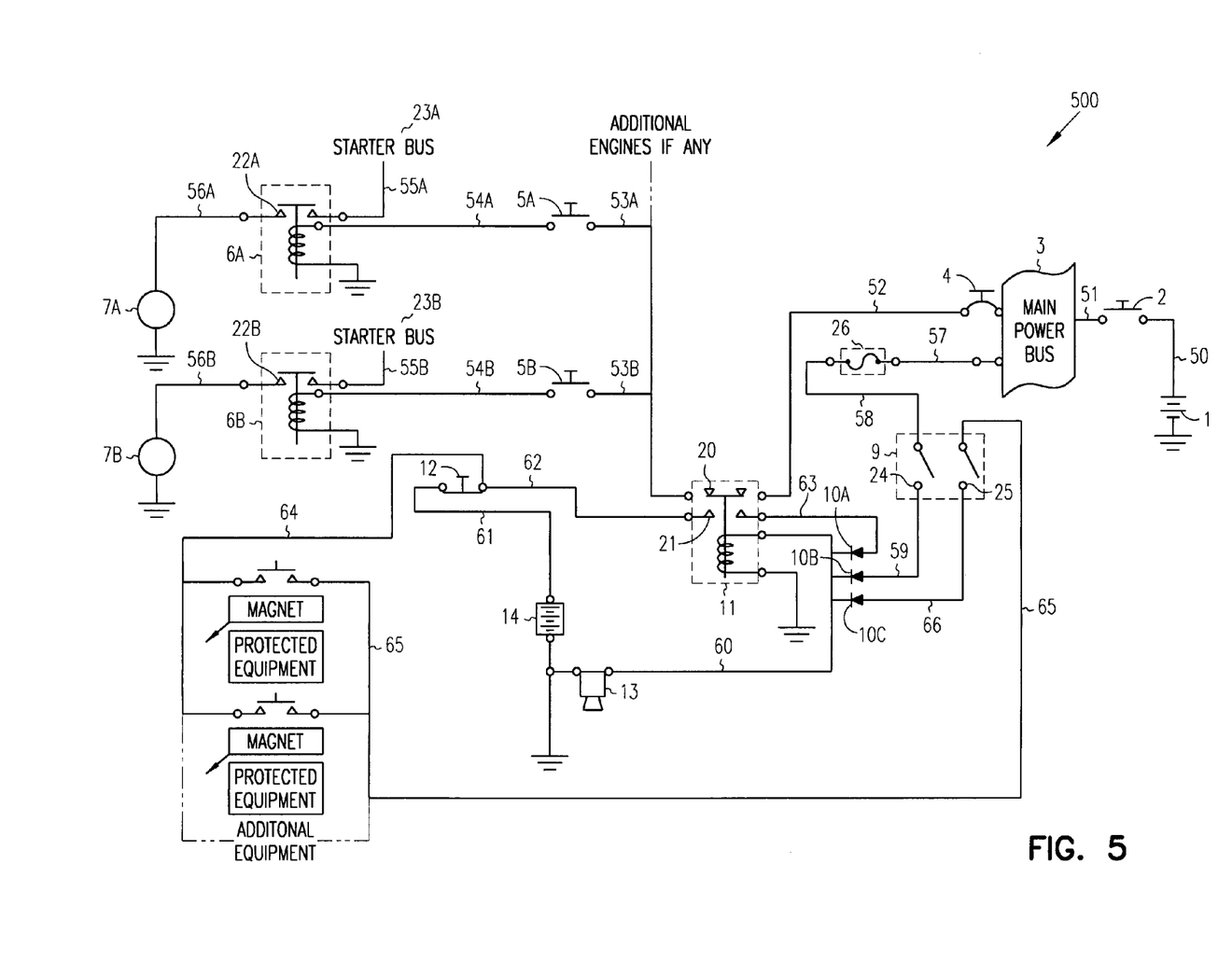
FIG. 5 illustrates a schematic view of one embodiment of the present Aircraft Security System configured for multi engine aircraft.

FIG. 4 illustrates an embodiment of the security system 400 enhanced to provide security against unauthorized entry and unauthorized removal of installed devices. The embodiment is shown for single engine aircraft, but is equally applicable to multi-engine aircraft as shown in FIG. 5. Reference numbers are repeated for elements of FIG. 4 that are the same or similar to those of FIG. 2. Elements in FIG. 5 depicting additional iterations of the same or similar elements as depicted in FIG. 4 are shown using the same reference numbers with the addition of a letter, for example, "A" or "B."

Various embodiments of security system 400 are enhanced to include security switch 9 coupled to main power bus 3 through electrical connection 57 and a circuit protection device, for example, an in-line fuse 26, is included between electrical connections 57 and 58. Electrical connection 58 couples circuit 24 of security switch 9 through diode 10B to electrical connection 60, which then is coupled to the coil (the control portion) of security relay 11. When security switch 9 is closed (armed) and master switch 2 is activated, power from main battery 1 flows from main battery 1 through master switch 2 and main power bus 3, and further through circuit 24 of security switch 9 to energize the coil of security relay 11.

Once activated, security relay 11 opens normally closed contacts 20 and closes normally open contacts 21, latching security relay 11 through remote battery 14 and remote switch 12 while preventing the powering of starter relay 6, as described above. Further, in various embodiments, alarm 13 is activated when security relay 11 is energized.

As illustrated in FIG. 4, in various embodiments of system 400, aircraft doors and removable equipment are protected with switches 15 and 16. In FIG. 4, switches 15 and 16 are shown as magnetic switches. However, switches 15 and 16 are not limited to being magnetic switches. In one embodiment, switches 15 and 16 are motion activated. In an embodiment, switches 15 and 16 are proximity switches. In various embodiments, other type switches are possible, including, but not limited to, optical, Hall effect, pressure, or other types of switches, such as proximity or motion activated switches. In various embodiments, additional switches are included. In various embodiments, switches 15 and 16 will not be the same type of switch. It will be recognized that various type switches, and various combinations of types of switches, may be used in a variety of applications and in various combinations. In various embodiments, switches 15 and 16 are in communication with system 400 using a wireless form of coupling.

In various embodiments, switches 15 and 16 are arranged so that when a door or a hatch of the aircraft is opened, or in the case of installed equipment, the equipment is tampered with or removed from its housing, the associated switch 15 or 16 is actuated. This allows current to flow from remote battery 14 through electrical connection 61 and remote switch 12, on through electrical connection 64 and the now actuated contacts of switches 15 or 16, then on through electrical connection 65 to the circuit 25 of the security switch 9. If the security system is set on (armed), the circuit 25 of security switch 9 will be closed, allowing current to flow through electrical connection 66 and diode 10C to activate and latch security relay 11, as discussed above. In various embodiments, alarm 13 is also activated when security relay 11 is activated or latched. In various embodiments, alarm 13 includes an audible alarm. In various embodiments, the alarm is a silent alarm. In various embodiments, alarm 13 includes notification of the activation of the alarm to one or more various parties, including but not limited to, the aircraft owner, the aircraft operator, airport security officials, and law enforcement officials.

In one embodiment, activation of security relay 11 will cause normally closed contacts 20 to open, and thus prevent starting of the engine associated with starter motor 7, even if starter switch 5 is tampered with as discussed above. In an embodiment, alarm 13 is turned off by opening remote switch 12 as discussed above.

FIG. 5 illustrates an embodiment where the security system 500 is useful in applications, including, but not limited to, use in multiple engine aircrafts. Reference numbers are repeated for elements of FIG. 5 which are the same or similar to those of FIG. 4. Elements in FIG. 5 depicting additional iterations of the same or similar elements as depicted in FIG. 4 are shown using the same reference numbers with the addition of a letter, for example, "A" or "B."

As illustrated in FIG. 5, in various embodiments of system 500, aircraft doors and removable equipment are protected with switches 15 and 16. In various embodiments, switches 15 and 16 are arranged so that when the door or hatch of the aircraft is opened, or in the case of installed equipment, the equipment is tampered with or removed from its housing, the associated switch 15 or 16 is actuated. In various embodiments, switches 15 and 16 are in communication with the system 500 through a wireless coupling. In various embodiments, if either of switches 15 or 16 actuate when security switch 9 is activated (armed), security relay 11 will be energized, and normally closed contacts 20 will open. With normally closed contacts 20 open, power is disconnected from starter switches 5A and 5B, and thus activation of either of starter switches 5A or 5B, even if tampered with or bypassed, will not enable the starting of either of the aircraft's engines associated with starter relays 6A and 6B. In various embodiments, if provided, additional engine starting circuits, for example, circuits associated with starter switches 5C and 5D (associated starter relays and starter motors not shown), would also be disconnected from power, and thus would also disable the starting of the aircraft's engine associated with that circuit.

In various embodiments of system 500, activation of security relay 11 will latch relay 11. In various embodiments, alarm 13 is also activated when security relay 11 is activated or latched. In an embodiment, alarm 13 is turned off by opening remote switch 12 as discussed above.

This description has set forth numerous characteristics and advantages of various embodiments and details of structure and function of an aircraft security system, but is intended to be illustrative and not intended in an exclusive or exhaustive sense. Changes in detail, material and management of parts, order of process and design may occur without departing from the scope of the appended claims and their legal equivalents.

What is claimed is:

1. A system for securing an aircraft having a starter, a starter switch, and a master switch to connect a first power source to a main power bus in an on position, comprising:
   a security system connected to control power to the starter, the security system including:
      a security switch adapted to arm the security system in an armed state and disarm the security system in a disarmed state;
      a second power source to provide backup power to the security system; and
      a controllable switch adapted to complete a starter circuit for powering the starter in a first mode and to break the starter circuit in a second mode, the controllable switch adapted to be controlled by sensing states of at least the security switch and the main power bus,
   wherein in the armed state the security system is configured to prevent activation of the starter upon detection of attempted use of the aircraft before disarming the security system.

2. The system of claim 1, wherein attempted use of the aircraft before disarming the security system includes the master switch being switched to the on position.

3. The system of claim 1, wherein the second power source is connected to the controllable switch and is adapted to maintain the controllable switch in the second mode once the controllable switch has entered the second mode.

4. The system of claim 1, further including a remote switch to reset the security system when activated.

5. The system of claim 1, further including the controllable switch being adapted to be controlled by sensing states of one or more switches connected to the second power source.

6. The system of claim 5, wherein one or more switches connected to the second power source includes a switch associated with a door of the aircraft.

7. The system of claim 5, wherein one or more switches connected to the second power source includes a switch associated with an installed device of the aircraft.

8. The system of claim 1, further including an alarm coupled to the security system.

9. The system of claim 1, wherein the second power source is coupled to the alarm and is adapted to power the alarm when activated until a remote switch resets the security system.

10. The system of claim 1, wherein in the armed state the security system is configured to prevent activation of a second starter upon detection of attempted use of the aircraft before disarming the security system.

11. An aircraft electrical system comprising:

a master switch connected to a battery;

a starter relay having a starter switch interconnecting the main switch to the starter relay;

a security switch connected to the main switch; and a security relay having a coil connected to the security switch;

wherein the security relay interconnects the main switch and the starter relay in a coil unpowered state of operation, and further disconnects the main switch and the starter relay and interconnects a remote battery and the coil in a coil powered state of operation.

12. The system of claim 11, wherein a normally closed set of contacts of the security relay interconnects the main switch and the starter relay in the coil unpowered state of operation.

13. The system of claim 11, wherein a normally open set of contacts of the security relay interconnects the remote battery and the coil in the coil powered state of operation.

14. The system of claim 13, wherein a remote switch interconnects the remote battery and the normally open set of contacts of the security relay.

15. The system of claim 11, further including an alarm, wherein the alarm interconnects to the remote battery in the coil powered state of operation.

16. The system of claim 11, further including a switch, wherein the switch interconnects the remote battery through the security switch to the coil.

17. The system of claim 16, wherein the switch is adapted to interconnect the remote battery through the security switch to the coil when a door associated with the switch is opened.

18. The system of claim 16, wherein the switch is adapted to interconnect the remote battery through the security switch to the coil when an installed device associated with the switch is removed.

19. The system of claim 11, wherein the security relay interconnects the main switch and a plurality of starter relays in the coil unpowered state of operation.

* * * * *